United States Patent [19]

Musch et al.

[11] 4,452,947
[45] Jun. 5, 1984

[54] PROCESS FOR THE PRODUCTION OF SULPHUR-MODIFIED SOLID CHLOROPRENE RUBBERS

[75] Inventors: Rüdiger Musch, Bergisch-Gladbach; Wilhelm Göbel, Leverkusen; Eberhard Müller, Dormagen; Wolfgang Konter, Neuss, all of Fed. Rep. of Germany

[73] Assignee: Bayer Aktiengesellschaft, Leverkusen, Fed. Rep. of Germany

[21] Appl. No.: 496,413

[22] Filed: May 20, 1983

Related U.S. Application Data

[63] Continuation-in-part of Ser. No. 436,515, Oct. 25, 1982, abandoned.

[30] Foreign Application Priority Data

Nov. 3, 1981 [DE] Fed. Rep. of Germany ....... 3143524

[51] Int. Cl.³ .............................................. C08F 8/00
[52] U.S. Cl. .................................... 525/194; 525/215; 525/330.8; 525/331.3; 525/343; 525/350
[58] Field of Search ............... 525/215, 194, 436, 515, 525/330.8, 331.3, 343, 350

[56] References Cited

U.S. PATENT DOCUMENTS 3,752,785  8/1973  Smith ................................. 525/215

FOREIGN PATENT DOCUMENTS 1807298  4/1984  Fed. Rep. of Germany .

Primary Examiner—J. Ziegler
Attorney, Agent, or Firm—Connolly and Hutz

[57] ABSTRACT

Vulcanisable, elastomeric chloroprene-sulphur copolymers having viscosities of from 60 to 35 MU, strengths of >20 MPa and sulphur contents of from about 0.5 to 0.7%, by weight, in the batch are obtained by polymerising chloroprene in the presence of from 0.10 to 0.35%, by weight, of sulphur to form a latex I, polymerising chloroprene in the presence of from 0.50 to 1.00% by weight, of sulphur to form a latex II, mixing latices I and II in a ratio of from 4:1 to 1:4 (based in each case on solids), optionally together with other sulphur-modified polychloroprene latices, the mixture is peptised and worked-up to form the solid rubber, the percentages quoted being based on the quantity of monomer.

3 Claims, No Drawings

PROCESS FOR THE PRODUCTION OF SULPHUR-MODIFIED SOLID CHLOROPRENE RUBBERS

This is a continuation-in-part of Ser. No. 436,515, filed Oct. 25, 1982, now abandoned.

This invention relates to a process for the production of a vulcanisable elastomeric chloroprenesulphur copolymer having viscosities of from 60 to 35 Mooney units, strengths of >20 MPa and sulphur contents of from 0.5 to 0.7%, by weight, in the batch.

Sulphur-modified polychloroprene rubber has many valuable properties and, because of this, has been adopted for use on a wide scale. In this connection, favourable mastication properties and vulcanisability without a need for the addition of thiourea accelerators must be regarded as particular advantages. By virtue of its high dynamic load capacity, the polymer is particularly suitable for articles such as V-belts and pneumatic bellows.

In the case of S-modified chloroprene polymers, the extent and nature of the S-incorporation have a major influence upon properties. If the sulphur content of the polymer is too low, the product, although having considerable strength, may no longer be degraded by peptisation to a viscosity level favourable for processing. If the sulphur content is too high, the product obtained is unstable as regards viscosity and has unfavourable vulcanisate properties. For an average sulphur content of from 0.5 to 0.7%, by weight, in the batch, based on chloroprene, the required viscosity range, but not the required strength, is obtained. As already indicated, the sulphur contents are based in each case on the sulphur content in the batch because no sufficiently accurate analytical techniques are available for determining the quantity of sulphur incorporated with a low limit of inaccuracy.

An object of the present invention is to provide a process by which it is possible to obtain S-modified vulcanisable solid polychloroprene rubbers which, for sulphur contents of from 0.5 to 0.7%, by weight, in the batch, show viscosities of from 60 to 35 Mooney units after peptisation and strengths of >20 MPa after vulcanisation.

According to the present invention, this object is achieved in that chloroprene is polymerised in aqueous emulsion in the presence of from 0.10 to 0.35%, by weight, of sulphur to form a latex I, chloroprene is polymerised in aqueous emulsion in the presence of from 0.50 to 1.00%, by weight, of sulphur to form a latex II, latices I and II are mixed, optionally together with other sulphur-modified polychloroprene latices, in a ratio of from 4:1 to 1:4 (based in each case on solids), the mixture is peptised and worked-up in the conventional way to form solid rubber, the percentages quoted being based on the quantity of monomer. Peptisation and working-up may be carried out, for example, in accordance with DE-OS No. 1,807,298 of June 4, 1970.

Sulphur-modified polychloroprene rubbers having average sulphur contents of from 0.5 to 0.7%, by weight, in the batch are obtained by the process according to the present invention. If chloroprene is similarly reacted with this amount of sulphur in a single-stage reaction, the rubbers obtained have viscosities in the required range, but only show strengths below 20 MPa after vulcanisation.

On account of a greater reduction in viscosity, the separate peptisation of latices I and II, subsequent mixing and collective working-up give rubbers characterised by poorer crude material and vulcanisate properties, for example poorer stability in storage and lower strengths.

Subsequent mixing of the solid polymers, for example on mixing rolls, is also unfavourable for the production of a vulcanisate mixture because, since the material is subjected to twice the degree of stressing on the mixing rolls during preparation of the mixture and during incorporation of the additives for vulcanisation, the viscosity of the mixture undergoes a premature undesirable increase.

In the context of the present invention, "chloroprene polymers" are to be understood to be chloroprene polymers in which up to 10%, by weight, of the chloroprene is replaced by one or more other copolymerisable monomers, such as 2,3-dichlorobutadiene, 1-chlorobutadiene, butadiene, isoprene, acrylic acid, methacrylic acid, acrylonitrile or methacrylonitrile.

Preferably up to 5%, by weight, is replaced by 2,3-dichlorobutadiene.

In general, the molecular weight of the sulphur-modified polymers is not adjusted by regulators added during the polymerisation reaction, but instead by a so-called "peptisation" step carried out after polymerisation. In the context of the present invention, "peptisation" is to be understood to be the cleavage of the polymer chain at its sulphur segments. This step is necessary because the rubber may only be optimally processed in certain viscosity ranges. The peptisation agent frequently used, tetraethyl thiouram disulphide (TETD), may be combined with substances having a nucleophilic effect, such as amines or dithiocarbamate (DE-OS No 2,018,736, DE-AS No. 1,230,204). The latex obtained after polymerisation is normally peptised at from 30° to 70° C. The peptisation velocity depends, inter alia, upon the quantity of peptising agent used, upon the type and quantity of the nucleophilic substance and upon the temperature and the pH of the latex. Degradation of the polymer may be carried out either in the latex or on the solid crude polymer, for example after low-temperature coagulation of the latex.

If the solid polymer is stored at room temperature, its Moony viscosity undergoes a further gradual reduction, passes through a minimum and then rises again. In the event of excessive peptisation in the latex phase, the Mooney viscosity of the polymer rises immediately, particularly if the rubber is subsequently subjected to fairly severe thermal stressing. This effect is undesirable and may largely be prevented by the addition of TETD immediately before the latex is worked-up to form the solid rubber.

It has now been found that, after working-up, the products produced in accordance with the present invention show excellent storage behaviour even when the quantities of TETD subsequently added are considerably smaller than is the case with chloroprene-sulphur copolymers of comparable sulphur content.

EXAMPLE 1

Production of the polymer latices 970 g of chloroprene and 30 g of 2,3-dichlorobutadiene are emulsified in 1500 g of water to which 55 g of disproportionated resinic acid (solids content 70%), 5 g of the sodium salt of a naphthalene sulphonic acid/formaldehyde condensation product, 5 g of sodium hydroxide, 3 g of anhydrous sodium pyrophosphate, 5 g of triisopropanolamine and from 4 to 20 g of a 50% sulphur dispersion have been added.

10 g of potassium persulphate and 0.2 g of sodium-$\beta$-anthraquinone sulphonate dissolved in 490 g of water are prepared for use as the catalyst solution.

The emulsion is purged with nitrogen, heated to 50° C. and the polymerisation reaction initiated by the addition of catalyst solution. More catalyst solution is added during polymerisation at such a rate that the temperature of the batch does not exceed 50° C. After a monomer conversion of 65%, the polymerisation reaction is stopped by the addition of 1 g of phenothiazine and the excess monomer is separated off by steam distillation under reduced pressure. A latex having a solids content of from 26.5 to 27.0%, by weight, is obtained. Latices A-G contain the following quantities of sulphur in the batch:

| Latex | A | B | C | D | E | F | G |
|---|---|---|---|---|---|---|---|
| Sulphur dispersion (50%) | 4 | 7 | 8 | 10 | 12 | 14 | 20 (g) |

EXAMPLES 2 to 10

115 g to TETD are added to quantities of 40 kg of the latices and latex mixtures, followed by peptisation at 40° C. The pH is then adjusted to <7 by the addition of acetic acid and, after the addition of another 145 g of TETD, the polymer is precipitated by low temperature coagulation and dried.

The sulphur contents and Mooney viscosities are shown in the following Table, Examples 2 to 5 being Comparison Examples.

| Example No. | %, by weight, of the latices in the mixture | | | | | | | %, by weight, of sulphur based on monomer | Mooney viscosity (MU) |
|---|---|---|---|---|---|---|---|---|---|
| | A | B | C | D | E | F | G | | |
| 2 | — | — | 100 | — | — | — | — | 0.4 | 102 |
| 3 | — | — | — | 100 | — | — | — | 0.5 | 56 |
| 4 | — | — | — | — | 100 | — | — | 0.6 | 55 |
| 5 | — | — | — | — | — | 100 | — | 0.7 | 50 |
| 6 | — | 33 | — | — | 33 | — | 33 | 0.66 | 54 |
| 7 | 25 | — | — | — | 75 | — | — | 0.5 | 53 |
| 8 | — | 75 | — | — | — | — | 25 | 0.51 | 54 |
| 9 | 20 | — | — | — | — | 80 | — | 0.6 | 56 |

EXAMPLES 10 to 13

Stability in storage 3.7 kg of the latices of Examples 5 and 6 are peptised with the following quantities of TETD, followed by working-up. TETD is subsequently added for stability in storage.

The Mooney viscosity of the polymer is required to show no change or only a gradual reduction after storage at 70° C. In the case of Comparison Examples 10 to 12, this effect is only obtained with a distinctly higher content of TETD.

| Example No. | 10 | 11 | 12 | 13 |
|---|---|---|---|---|
| Latex of Example No. | 5 | 6 | 5 | 6 |
| Peptisation with TETD (g) | 7 | 7 | 7 | 7 |
| Subsequent TETD addition (g) | 18 | 10 | 6 | 6 |
| ML-4 (immediately) (MU) | 45 | 51 | 53 | 51 |

-continued

| Example No. | 10 | 11 | 12 | 13 |
|---|---|---|---|---|
| Latex of Example No. | 5 | 6 | 5 | 6 |
| ML-4 (70° C., 1 day) (MU) | 37 | 54 | 63 | 49 |

EXAMPLES 14 to 17

Rough-sheet formation time

The time taken for a continuous sheet to form is measured on 200 mm diameter mixing rolls having a working width of 390 mm and a friction ratio of 1:1.113 for a speed of the slower roll of 7 min$^{-1}$, a gap of 3 mm between the rolls, an initial temperature of the rolls of from 35° to 40° C. and an input of 1500 g of rubber. Examples 14 and 16 are Comparison Examples.

| Example No. | Polychloroprene according to Example No. | Rough sheet formation time (mins.) |
|---|---|---|
| 14 | 5 | 2.5 |
| 15 | 6 | 1.0 |
| 16 | 3 | 4.5 |
| 17 | 8 | 1.5 |

EXAMPLES 18 to 20

Vulcanisation rate

A carbon black mixture of the polymers prepared in accordance with ISO 2475 is vulcanised at 150° C. The times in which 10% and 90% of the vulcanisation process has taken place are determined. A short reaction time ($t_R = t_{90} - t_{10}$) is desirable for economic and practical reasons. Examples 18 and 19 are Comparison Examples.

| Example No. | 18 | 19 | 20 |
|---|---|---|---|
| Polymer of Example No. | 4 | 5 | 6 |
| $t_R$ (mins). | 21.5 | 17.7 | 3.8 |

EXAMPLES 21 to 24

Vulcanisate strength

Vulcanisation is carried out in accordance with Example 18 in 3 stages (20, 40, 60 minutes) and the strengths of the corresponding test specimens are determined in accordance with DIN 53 455. The average-value of the 3 stages is quoted in each case. Examples 21 and 23 are Comparison Examples.

| Example No. | 21 | 22 | 23 | 24 |
|---|---|---|---|---|
| Polymer of Example No. | 4 | 9 | 3 | * |
| Strength (MPa) | 18.2 | 20.4 | 19.4 | 21.6 |

We claim:
1. A process for the production of sulphur-modified, vulcanisable solid chloroprene rubbers having viscosities of from 60 to 35 MU and sulphur contents of from 0.5 to 0.7%, by weight, in the batch as a whole, comprising polymerising chloroprene in the presence of from 0.10 to 0.35%, by weight, of sulphur to form a latex I, polymerising chloroprene in the presence of from 0.50 to 1.00%, by weight, of sulphur to form a latex II, mixing latices I and II in a ratio of from 4:1 to 1:4 (based in each case on solids), peptising the mixed latex, adjusting the pH to <7, coagulating and drying the mixture to form the solid rubber, the percentages quoted being based on the quantity of monomer.
2. The process of claim 1, wherein up to 10%, by weight, of the chloroprene is replaced by one or more other copolymerisable monomers.
3. The process of claim 1, wherein up to 5%, by weight, of the chloroprene is replaced by 2,3-dichlorobutadiene.

* * * * *